(12) United States Patent
Cichosz et al.

(10) Patent No.: US 9,684,874 B2
(45) Date of Patent: Jun. 20, 2017

(54) PARALLEL DECISION OR REGRESSION TREE GROWING

(71) Applicant: International Business Machines Corporation, Armonk, NY (US)

(72) Inventors: Pawel Cichosz, Warsaw (PL); Mieczyslaw Klopotek, Mazowiecki (PL); Krzysztof Skowronski, Brwinow (PL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 400 days.

(21) Appl. No.: 14/327,883

(22) Filed: Jul. 10, 2014

(65) Prior Publication Data

US 2015/0032674 A1    Jan. 29, 2015

(30) Foreign Application Priority Data

Jul. 26, 2013 (GB) .................................. 1313326.9

(51) Int. Cl.
*G06N 99/00* (2010.01)
*G06F 17/30* (2006.01)
*G06N 5/00* (2006.01)

(52) U.S. Cl.
CPC ..... *G06N 99/005* (2013.01); *G06F 17/30327* (2013.01); *G06N 5/003* (2013.01)

(58) Field of Classification Search
None
See application file for complete search history.

(56) References Cited

U.S. PATENT DOCUMENTS

| 5,787,274 | A | * | 7/1998 | Agrawal | ........... G06F 17/30705 |
| 6,859,804 | B2 | | 2/2005 | Kamath et al. | |
| 6,938,049 | B2 | | 8/2005 | Kamath et al. | |
| 7,062,504 | B2 | | 6/2006 | Cantu-Paz et al. | |
| 8,065,326 | B2 | | 11/2011 | Li et al. | |

(Continued)

OTHER PUBLICATIONS

List of IBM Patents or Patent Applications Treated as Related; Jul. 10, 2014; pp. 1-2.

(Continued)

*Primary Examiner* — Alan Chen
(74) *Attorney, Agent, or Firm* — Cantor Colburn LLP; Yeen Tham (57) ABSTRACT

Embodiments relate to growing a plurality of trees in parallel. An aspect includes creating, for each of a plurality of trees, a data bag based on a training data set comprising a plurality of data records. Another aspect includes splitting the training data set into disjoint data sub-sets; and storing each of the sub-sets in a respective data slice. Another aspect includes performing a single pass through the data records stored in a data slice, thereby identifying one or more of the current nodes that are assigned data records; calculating an intermediate result for each identified current node based on all data records of said data slice; and merging intermediate results into a combined intermediate result. Another aspect includes, for each of the current nodes: calculating a split criterion from the combined intermediate result; and creating two or more child nodes of the current node based on the split criterion.

20 Claims, 4 Drawing Sheets

(56) References Cited

U.S. PATENT DOCUMENTS

2003/0229630 A1  12/2003  Kamath et al.
2006/0218169 A1   9/2006  Steinberg et al.

OTHER PUBLICATIONS

J. Elith, et al., "A Working Guide to Boosted Regression Trees," Journal of Animal Ecology 2008, 77, 802-813.
S. Nowozin, "Improved Information Gain Estimates for Decision Tree Induction," Proceedings of the 29th International Conference on Machine Learning, Edinburgh, Scotland, UK, 2012; pp. 1-8.
B. Panda, et al., "Planet: Massively Parallel Learning of Tree Ensembles with MapReduce," VLDB '09, Aug. 24-28, 2008, Lyon, France; pp. 1-12.
UK Application No. GB1313326.9 from Intellectual Property Office Search Report dated Nov. 29, 2013; 12 pages.
P. Cichosz, et al., "Parallel Tree Based Prediction," Related U.S. Appl. No. 14/327,918, filed Jul. 10, 2014.

\* cited by examiner

PARALLEL DECISION OR REGRESSION TREE GROWING

PRIORITY

This application claims priority to United Kingdom Patent Application No. GB 1313326.9, filed Jul. 26, 2013, and all the benefits accruing therefrom under 35 U.S.C. §119, the contents of which in its entirety are herein incorporated by reference.

BACKGROUND

The present disclosure relates generally to machine learning, and more particularly to computing decision trees or regression trees.

The growing of decision and regression trees is widely used in machine learning and data mining for generating predictive tree models. In these tree models, leaves comprise class labels (for decision trees) or numeric target attribute values (for regression trees) and branches represent conjunctions of features that lead to those class labels or target attribute values. Decision trees are data structures which are used for classifying input data into predefined classes. Regression trees are data structures which are used for calculating a predicted data value, e.g. an integer, from input data. Multiple tree models may be used together in an ensemble model for improving accuracy. An ensemble may consist of several thousand trees or more. The prediction result of each individual tree in an ensemble model is combined, e.g. based on a voting or averaging procedure, for generating a final result of said ensemble model.

The trees in the 'ensemble models' or 'ensembles' are generated from different data bags (derivative sets or subsets of the available training data). It is a common approach to calculate derivative data sets (also called 'data bags') from the available training data and generate a decision or regression tree based on each of said data bags separately. The resulting 'ensemble model', will in general provide more accurate predictions than a single tree created from the totality of the available training data.

In ensemble tree modelling, the growing of multiple trees may be computationally much more expensive than growing a single tree on the totality of training data. This is because the growing of each node in each of the trees generally involves a heavy computation of statistics on attribute values of a large number of training data records. Data bags may be distributed to different processing nodes in a grid for growing a tree by each of the nodes of said grid. As the data bags may comprise large overlaps, a huge amount of data has to be moved to the respective grid nodes and used for processing the trees. This results in increased network traffic and a high processing load of the individual grid nodes.

The computational costs of ensemble tree growing are also an obstacle for implementing such algorithms in (analytical) databases, which have to provide sufficient processing capacity for executing complex joins over multiple database tables and other computationally demanding tasks and therefore must not spend all available processing capacity on tree growing.

In standard tree growing techniques, multiple data bags are calculated from an original training data set. A single tree growing algorithm is applied to each of the data bags. Therefore, the cost of growing an ensemble of N trees by using standard tree growing approaches is N times greater than the cost of growing a single tree. Thus, the creation of an ensemble model is computationally much more expensive than the growing of a single tree model. If trees are grown in a parallel in-database analytics environment such as Netezza Analytics™, which already provides some algorithms for decision and regression trees, the overhead for executing the stored procedures and user-defined functions or the creation of temporal tables will slow down the calculation of ensemble models.

SUMMARY

Embodiments relate to growing a plurality of decision or regression trees in parallel. An aspect includes creating, for each of a plurality of trees to be grown, a data bag, each data bag being a derivative of a training data set, the training data set comprising a plurality of data records, the data bags acting as data basis for a respective one of the trees to be grown in a database management system that is in control of a plurality of processing units and of a plurality of data slices, the database management system being operable to process data stored in any one of the data slices by a respective one of the processing units. Another aspect includes splitting the training data set into disjoint data sub-sets, each sub-set comprising zero, one or more of the data records of each of the data bags; storing each of the sub-sets in a respective one of the data slices; for each one of the plurality of trees to be grown, creating a respective root node; for each one of the data bags, and assigning its data records to the root node of the tree to be grown on said data bag. Another aspect includes growing each of the plurality of trees by: designating the root node as a set of current nodes; for each one of the data slices in parallel, by a respective one of the processing units, performing a single pass through the data records stored in said data slice, thereby identifying one or more of the current nodes having assigned one or more of the data records in said data slice, the identified current nodes belonging to one or more of the trees, and calculating an intermediate result for each of said identified current nodes based on all data records of said data slice assigned to said current node; merging, for each of the identified current nodes, any intermediate results that were calculated for said current node, into a combined intermediate result for said current node. Another aspect includes, for each one of the current nodes: calculating a split criterion from the combined intermediate result of said current node; creating two or more child nodes of the current node based on the calculated split criterion; dividing the data records assigned to the current node in dependence on the split criterion; de-assigning each one of the data records from the current node and assigning said data record to one of the child nodes according to said division; and designating the child nodes that were generated by the data-slice-parallel execution as the set of current nodes.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

Various embodiments will now be described, by way of example only, with reference to the following drawings in which.

DETAILED DESCRIPTION

Embodiments disclosed herein relate to parallel decision or regression tree growing. As used herein, a 'data bag' or 'bag' is a perturbed version or perturbed sub-set of an original training dataset. 'Perturbed' implies that the generated data bags differ from each other and from the original training data set in respect to the number and kind of training data records contained therein and/or in respect to weights assigned to said training data records. A data bag may be created, for example, through sampling or weighting. A data bag may comprise a sub-set of the original training data or consist of a modified copy of all data records of the original training data set. Depending on the embodiments, the data bags may be disjoint or overlapping. Each data bag is used for growing a single tree of the final model, and the trees generated from all data bags of the original training data set constitute the ensemble tree model to be created based on said training data set. The diversity of the data bags causes a diversity of the resulting trees (which may be used for an ensemble model to yield an accuracy improvement over a single model). According to some embodiments, the data bags may be generated based on any bagging technique in which each data bag contains some or all of the original data records, possibly with a different number of copies and possibly with different weights, as long as the numbers of copies or weights are specified at generation time of the data bags and remain fixed (i.e., they are not determined or modified after/during model creation). The data bags may be generated, for example, by drawing with replacement (bootstrapping), drawing without replacement, jackknifing, random forests, boosting, or any other form of creating diverse data bags from an original set of training data records which may help to prevent overfitting.

In some embodiments, the tree-growing algorithm applied for growing the tree from a data bag is an unstable algorithm. An unstable algorithm is likely to yield substantially different models for marginally perturbed bags. Alternatively, or in addition, the tree-growing algorithm is weight-sensitive, meaning that data record weights (which are automatically been assigned to the data records of the bags upon bag creation) are evaluated during tree growing and that a small difference in the weights in different bags may yield substantially different trees. For example, the impact of each data record on the statistics calculated for a particular node is proportional to its weight. Calculating the statistics may imply counting the occurrences of particular attribute-value/class combinations and multiplying the result with the weight of said data record.

A 'database' as used herein is an organized collection of data managed by a database management system (DBMS). In particular, the DBMS may be a columnar or a relational DBMS. Examples for a DBMS are well-known DBMSs such as MySQL, PostgreSQL, SQLite, and IBM DB2®. The DBMS may be embedded in an ERP system or an analytical platform such as IBM Netezza Analytics.

According to embodiments, the concept of tree growing can roughly be summarized as follows: all training data records of a bag are assigned to a root node of the tree to be grown. All data records assigned to said node are analyzed, typically by a statistical evaluation of one or more attributes of all data records assigned to said node. The purpose of this analysis to calculate one or more split criteria for said node from the values of the attributes of the data records of said node and to divide all data records assigned to the analyzed node according to the one of the split criteria that is optimized by the split. For each of the data record fractions generated by the split a new node is generated acting as a child node of the analyzed node. The data records of each of said split fractions are assigned to the respective child nodes and the algorithm proceeds by selecting one of the child nodes and its assigned data records for analyzing the selected child node as described above, thereby growing the tree.

Various kinds of tree growing algorithm and corresponding splitting decisions are known in the art. They may result in different tree topologies. There exist tree growing algorithms generating two, three or any other predetermined number of child nodes for each split decision executed at a tree node. There also exist algorithms where a dynamically determined, flexible number of child nodes are generated. The decision, which kind and how many child nodes are generated for each node may be based on split criteria having been calculated by a linear function, e.g. a simple threshold function, or a more complex function. The predictor may be implemented as a support vector machine (SVM), a neural network, a statistical method, a heuristic or any other suitable function.

A 'split criterion' as used herein is a parameter or a set of parameters that shall be optimized (minimized or maximized) in each splitting decision. Optimizing said parameter may imply, for example, minimizing an impurity measure (for decision trees) such as the information gain, the Gini gain, or the entropy, etc., or minimizing a dispersion measure (for regression trees). Split criteria are typically calculated from attribute values and may have two or more outcomes, each corresponding to one child node. Split criteria may be, for example, equality conditions for discrete attributes (two child nodes), subset membership conditions for discrete attributes (two child nodes), value conditions for discrete attributes (each attribute value is a possible split outcome, the number of child nodes equal to the number of values of the attribute being used for the split), inequality conditions for continuous attributes (two child nodes), interval partitioning conditions for continuous attributes (as many child nodes as the number of intervals to which the set of values of the attribute being used for the split is partitioned).

The 'split criterion' calculated for a particular node is a function that assigns one of a set of possible split criteria, referred herein as 'candidate splits', to said node. The set of candidate splits for a node comprises all possible split criteria that can be applied in the node, one of which is selected as it optimizes the optimization-parameter best. Depending on the split criterion, a candidate split may be represented by one or more attribute-value pairs or (continuous or discontinuous) attribute-value range.

A 'parallel database system' as used herein is a DBMS that uses parallelization of at least some of its operations, in particular, operations like loading data from a storage, building indexes and evaluating queries. A parallel DBMS is operable to distribute data and processes automatically to multiple storage devices and CPUs. The distribution of data and processes may be automatically managed by the parallel DBMS based on performance considerations. A parallel DBMS may for example be based on a multiprocessor architecture or a hybrid architecture.

A 'data slice' as used herein is a data container located on a dedicated storage unit, e.g. a hard drive, whereby said storage unit is associated to a processing unit according to a 1:1 relationship. The relationship implies that the processing unit solely processes the data in the data container of its associated storage unit, but not the data of other data containers located on other storage units. In a multi-processor environment, each processor may have assigned exactly one storage unit and a respective data slice.

In one aspect, embodiments relate to a computer implemented method for growing multiple trees. The trees may be decision trees or regression trees. The method is implemented in a database management system being in control of a plurality of processing units and of a plurality of data slices. The database management system is operable to process data stored in any one of the data slices by a respective one of the processing units. The method comprises creating, for each of the trees to be grown, a data bag. Each data bag is a derivative of a training data set. The training data set comprises a plurality of data records and the data bags act as data basis for a respective one of the trees to be grown. For example, the data bags may be generated by any appropriate bagging technique. The training data set is split into disjoint data sub-sets, each sub-set comprising zero, one or more of the data records of each of the data bags. Preferentially, the sub-sets are of approximately equal size. The sub-sets may be created, for example, by randomly selecting data records of the training data set. Each of the sub-sets is stored to a respective one of the data slices. Thus, the available training data may be split approximately equally to the different data slices and respective processing units. For each one of the trees to be grown, a respective root node is created. For each one of the data bags, its data records are assigned to the root node of the tree to be grown on said data bag. Then, the trees may be grown by: using the root nodes as a set of current nodes; for each one of the data slices in parallel, by a respective one of the processing units, execute: performing a single pass through the data records stored in said data slice, thereby identifying one or more of the current nodes having assigned one or more of the data records in said data slice, the identified current nodes belonging to one or more of the trees, and calculating an intermediate result for each of said identified current nodes based on all data records of said data slice assigned to said current node; and merging, for each of the identified current nodes, all intermediate results, if any, calculated for said current node, into a combined intermediate result for said current node.

For each one of the current nodes, processing is stopped for the current node and removing said current node from the set of current nodes; or a split criterion is calculated from the combined intermediate result of said current node; creating two or more child nodes of the current node in dependence on the calculated split criterion; dividing the data records assigned to the current node in dependence on the split criterion; deassigning each one of the data records from the current node and assigning said data record to one of the child nodes according to said division; and using the totality of child nodes having been generated upon the data-slice-parallel execution of the method as the set of current nodes of a succeeding iteration of the method. The method is repeated while the set of current nodes is not empty.

A single tree growing algorithm is organized as an iteration over tree levels instead of single tree nodes: as the totality of child nodes having been generated upon the data-slice-parallel execution of the method are used as the set of current nodes of a succeeding iteration, in a single pass through the available training data the complex statistics of all nodes belonging to any one of the trees to be grown and sharing the same hierarchical level is calculated. Thus, other than parallel ensemble tree growing in a grid, the redundant distribution of a data record shared by multiple data bags/trees to the multiple grid processing nodes can be avoided as every data record is contained only in a single data slice. Thus, network traffic to and from the processing nodes may greatly be reduced in particular for trees grown on overlapping data bags.

In a further beneficial aspect, the data records are stored in the storage units of the respective processing units in a non-redundant form. Each pass through the totality of data records stored in the data slices is used for calculating an intermediate result (e.g., statistics calculated over all data records assigned to a node) for at least one current node of each of the trees to be grown. Thus, in a single pass, the statistics can be calculated for all current nodes of all the trees to be grown.

The intermediate result calculated for a current node may comprise, for example, for each of the attributes, an attribute value statistics over the attribute values of said attribute over all data records assigned to the current node. The combined intermediate result may comprise an attribute-specific combination of the intermediate results calculated for said attribute based on the data records in different data slices. Calculating a split criterion for said node may comprise calculating a candidate split from each of the attribute-specific intermediate result combinations and selecting one particular candidate split as the split criterion of the current node which optimizes a particular parameter, e.g. an impurity measure.

The iteration over the data slices is synchronized when calculating the combined intermediate results. In effect, the totality of trees to be grown may be considered as a forest, and each pass through the data records in all sub-sets corresponds to a calculation of the combined intermediate results for all nodes of a current level of said forest. The resulting algorithm creates a separate tree for each bag without requiring more computation than for creating a single tree for all the bags combined together. The intermediate result of a current node may comprise candidate splits and statistics used to evaluate and select the most optimum split criterion from the candidate splits.

According to embodiments, the trees that are grown are decision trees used for a classification task. The classification task may be one of image recognition, medical diagnosis by an expert system, quality control in a production line (identifying products which do not met a given quality standard). According to other embodiments, the trees that are grown are regression trees used for calculating a result value. The result value may be a predicted risk, e.g. a risk of developing a particular disease within a given time interval, the risk of a machine to fail within a given time interval, the predicted life expectancy of a machine, the production yield of an industrial process, the environment pollution due to an industrial process, the probability of a customer buying a particular product, the amount a customer will spend within a specified period, or the like. The database management system may be a parallel database management system.

According to embodiments the assigning of the data records to the root nodes comprises: for each of the sub-sets and for each of the trees to be grown, storing an assignment of the data records in said sub-set to the root node of said tree in the data slice comprising said sub-set, whereby said assignments are updated upon each de-assigning of the data records from one of the current nodes and upon each assigning of the data records to one of the child nodes of said current node. According to embodiments the identifying of the one or more of the current nodes having assigned one or more of the data records in the data slices is implemented by evaluating in parallel, by the processing units of the respective data slices, the assignments stored in said data slices. According to embodiments the method further comprises: evaluating, for each of the current nodes, one or more stop criteria, thereby taking the combined intermediate result of said current node as input. In case one of the stop criteria is met, processing for the current node is stopped. In case none of the stop criteria is met, block split criteria are determined.

According to embodiments the method further comprises creating a first table, the first table being centrally managed by the database management system; the first table may be a database table, e.g. a temporal database table, or any other form of tabular data structure, e.g. a list; the first table may be stored, for example, temporarily in the main memory; while growing the plurality of trees in parallel, continuously storing and updating the created root nodes and child nodes in the first table, wherein each root node and child node comprises an identifier of its respective tree. After having finished the growing of the plurality of trees, storing the plurality of trees and/or a model having been derived from a combination of said trees to a non-transitory storage medium; and deleting the first table, such that the overhead for maintaining and updating a tree structure, in this case, the first table, is performed only once.

According to embodiments the method further comprises, while growing the plurality of trees in parallel, continuously storing the intermediate results for each of the current nodes in the first table in association with the respective current node; alternatively, the intermediate results may be stored in a second table held in the main memory; the second table may be a database table or a generic tabular data structure, such as a list; and upon having passed all data records in all the data slices in parallel, calculating the combined intermediate results for all the current nodes, storing the combined intermediate results in the first or second table.

The computational overhead required for creating, handling and updating the nodes of the growing trees may be reduced: in state of the art systems wherein the trees and tree growing tasks are distributed to multiple processing nodes on a per-tree basis, each processing node, in addition to calculating intermediate results for the nodes, also has to support and manage the growing tree structure (which may involve the creation of indices, views, or the like). To the contrary, according to embodiments, the trees to be grown and the node-specific intermediate results are created and managed centrally for all the trees, and only the assignments of data records to the root nodes or, later, the current nodes, has to be supported and updated during tree growing by the respective processing unit.

According to embodiments the method further comprises automatically creating each of the data bags by means of splitting the training data sets into disjoint sub-sets; bootstrapping; jackknifing; using copies of the original training data set as data bags; or any one of the above, whereby different weights are randomly assigned to the data records in the data bags; or any one of the above, wherein each data record has assigned attribute values of a plurality of predefined attributes, whereby the set of attributes used for calculating the split criterion for the current nodes of each tree are a randomly selected sub-set of a super-set of attributes, the selection of attributes being executed in a per-tree-basis. For example, from a super-set of e.g. 100 attributes (machine state values, gene variants, etc.), a first randomly selected set of 10 attributes may be evaluated when growing tree T1, a second randomly selected set of 10 attributes may be evaluated when growing tree T2, and so forth.

The assignment of any one of the data records to a current node of any one of the trees may comprise weights. Each weight may positively correlate with the number of copies of said data record being contained in the data bag acting as the data basis for growing said tree; for data bags comprising multiple copies of the same data record, it is not necessary to transfer the data records multiple times to the respective data slice. It is sufficient to indicate the number of copies (instances) of said data record in a particular bag/tree in the assignment associated with said data record, e.g. in the form of a weight. This may help to reduce network traffic. In addition, or alternatively, each weight is a random value assigned to said data record upon creation of the data bags. The weight may also represent a combination of the first and second alternative, i.e., the weight may be a derivative (e.g. a product) of the number of data record instances in a data bag and a random value assigned to said data record upon data bag creation.

According to embodiments the method further comprises combining the trees into an ensemble model; and using the ensemble model on input data for classification tasks or for regression analysis. According to embodiments the method is executed by a module of the database management system. The module may be a parallel database engine or a data mining module. The module may be implemented as an integral part of the database management system or as a plug-in of the database management system. A 'plug-in' is a piece of software code that enables an application or program to do something it couldn't by itself. According to embodiments the combined intermediate results are distribution statistics to be used for calculating candidate splits-, wherein the split criterion of the current node is the one of said candidate splits of said current node which is the optimum split criterion in respect to an impurity measure or a dispersion measure.

The impurity measure may be, for example, the information gain, the classification error or the Gini gain. The dispersion measure may be, for example, the variance or standard deviation. A candidate split is a piece of data specifying to which child nodes of a current node the data records assigned to said current node should be distributed and re-assigned. Multiple candidate splits for different attributes may be calculated in for the same current node and the candidate split having the lowest impurity measure may be chosen for providing the resulting split criterion for the current node. Said split criterion is used for re-assigning the data records assigned to the current node to its one or more child nodes.

According to embodiments the stop condition is met when a further split at the current node would not produce an impurity increase lying above a threshold value (for decision trees); a further split at the current node would not produce a dispersion decrease lying above a threshold value (for regression trees); a further split at the current node would produce one or more child nodes whose number of assigned data records is below a threshold value; or a further split at the current node would exceed a maximum root-to-leaf depth of the tree.

In a further aspect, embodiments comprise a storage medium comprising computer-readable program code embodied therewith. When the program code is executed by a plurality of processing units, the code causes the processing units to execute a method according to anyone of the previous embodiments.

In a further aspect, embodiments relate to a computer system comprising: a plurality of processing units; a plurality of storage units respectively comprising a data slice, wherein data stored in any one of the data slices is selectively processed by a respective one of the processing units; and a database management system being in control of the processing units, the database management system being operable to execute a method for growing multiple trees. The trees can be decision trees or regression trees. The method comprises: creating, for each of the trees to be grown, a data bag, each data bag being a derivative of a training data set, the training data set comprising a plurality of data records, the data bags acting as data basis for a respective one of the trees to be grown; splitting the training data set into disjoint data sub-sets, each sub-set comprising zero, one or more of the data records of each of the data bags; storing each of the sub-sets to a respective one of the data slices; for each one of the trees to be grown, creating a respective root node; for each one of the data bags, assigning its data records to the root node of the tree to be grown on said data bag. Then, the database management system grows the trees by: using the root nodes as a set of current nodes; for each one of the data slices in parallel, by a respective one of the processing units, execute: performing a single pass through the data records stored in said data slice, thereby identifying one or more of the current nodes having assigned one or more of the data records in said data slice, the identified current nodes belonging to one or more of the trees, and calculating an intermediate result for each of said identified current nodes based on all data records of said data slice assigned to said current node; merging, for each of the identified current nodes, all intermediate results, if any, calculated for said current node, into a combined intermediate result for said current node. For each one of the current nodes: processing is stopped for the current node and removing said current node from the set of current nodes; or a split criterion is calculated from the combined intermediate result of said current node; creating two or more child nodes of the current node in dependence on the calculated split criterion; dividing the data records assigned to the current node in dependence on the split criterion; de-assigning each one of the data records from the current node and assigning said data record to one of the child nodes according to said division; and using the totality of child nodes having been generated upon the data-slice-parallel execution of the method as the set of current nodes of a succeeding iteration of the method. The method is repeated while the set of current nodes is not empty.

According to embodiments the computer system further comprises a first interface for receiving the number of the data bags to be created. In addition, or alternatively, the computer system comprises a second interface for returning an ensemble model, the ensemble model comprising all the grown trees.

Figure 1:
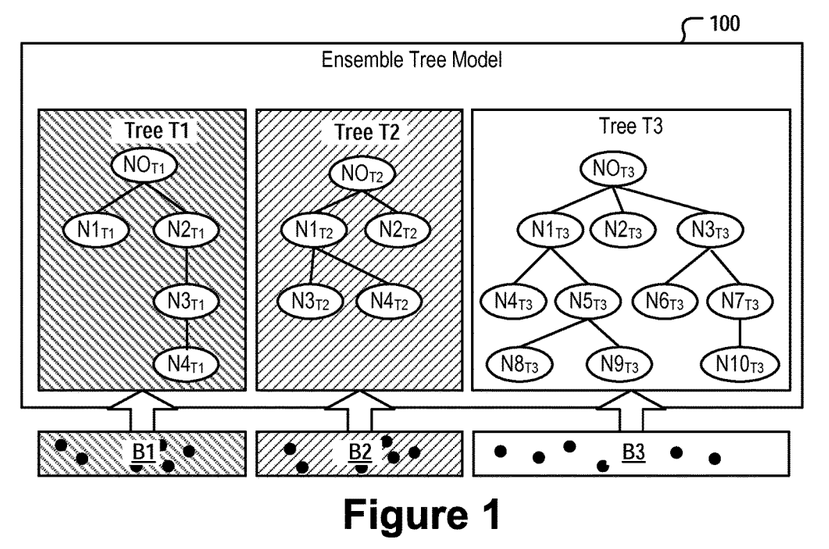
FIG. 1 depicts an embodiment of ensemble model with trees to be grown.

FIG. 1 depicts an ensemble model 100 comprising three trees T1-T3. Each tree has a root node $NO_{T1}$-$NO_{T3}$ respectively acting as initial node when growing the trees. Each of the trees is grown ('trained') based on data records of a respective data bag B1-B3. So tree T1 is grown on data records of data bag 91, tree T2 on bag B2, and tree T3 on bag B3. The individual data records (there may be several hundred, several thousand or more data records) are indicated by black circles. How the growing of the trees and thus, the creation of the ensemble model, may be achieved in an efficient manner according to embodiments is described in FIGS. 2, 3 and 5a-b.

Figure 2:
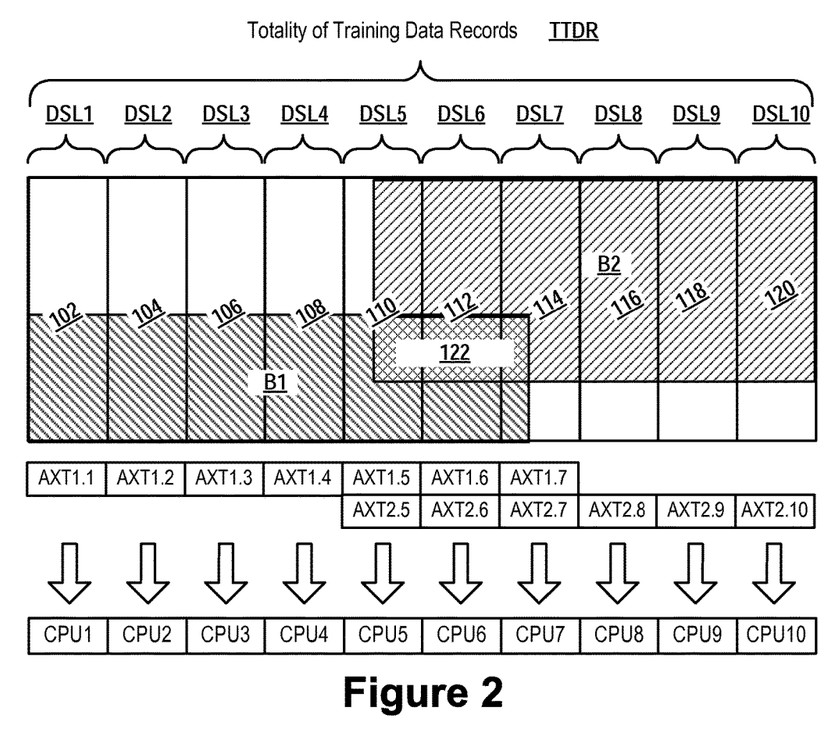
FIG. 2 depicts an embodiment of a relationship between data bags, data sub-sets, data slices and multiple CPUs.
Figure 3:
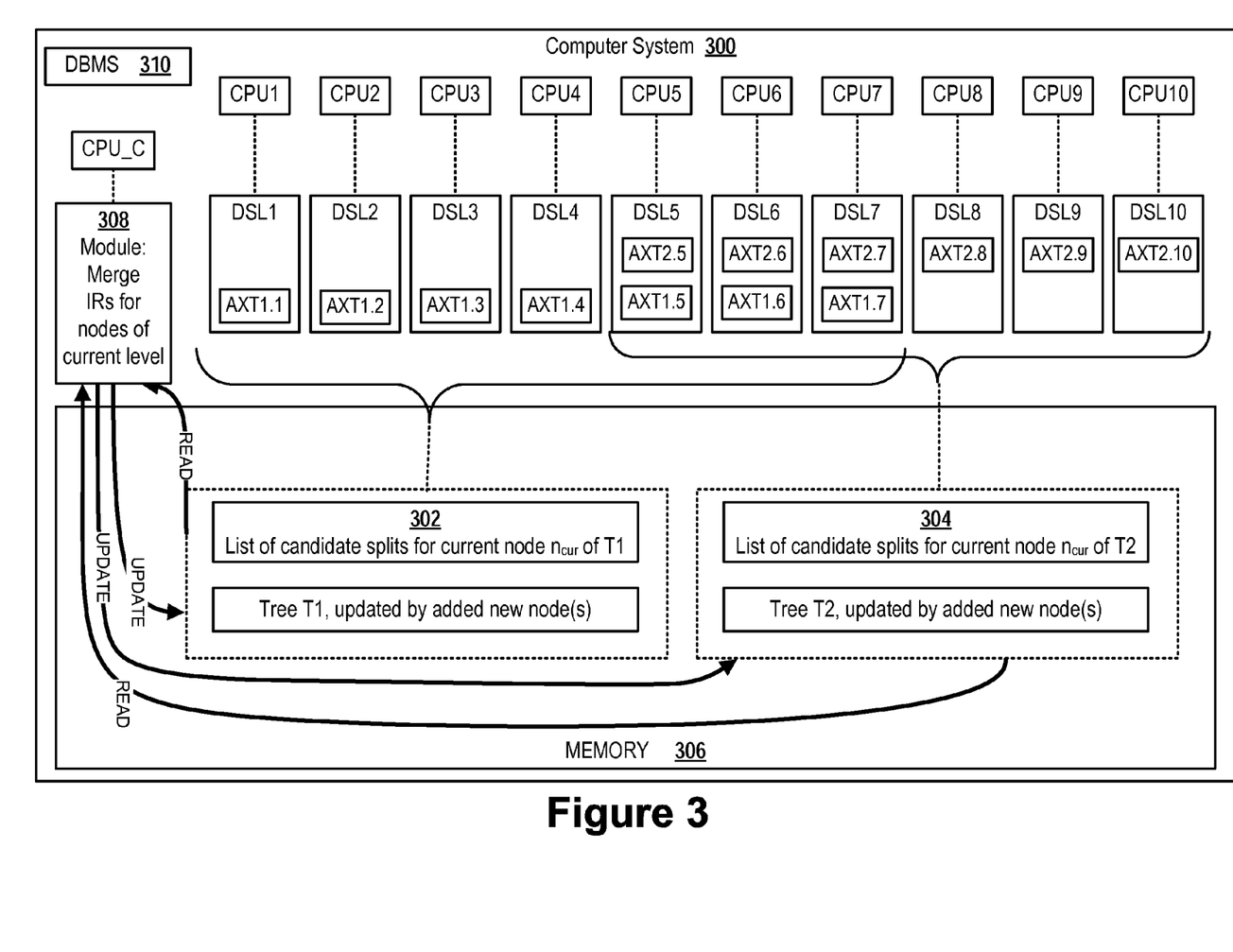
FIG. 3 shows an embodiment of a computer system comprising multiple CPUs.

FIG. 2 depicts the distribution of data records to processing units which has to be performed in preparation of the actual tree growing. The computer system 300 used for growing the trees as depicted for example in FIG. 3 is assumed to comprise a plurality of processing units CPU1-CPU10 respectively having assigned a data slice DSL1-DSL10. The totality of the available training data records, also referred to as 'training data set' TTDR, is split into a plurality of disjoint sub-sets 102-120. The splitting into sub-sets is completely independent from the process of 'bagging', i.e., the creation of the data bags B1-B3 as derivatives of the training data TTDR. In FIG. 2, only two data bags B1 and B2 are shown for clarity reasons. While the sub-sets 102-120 have to be disjoint, the data bags may overlap as indicated by area 122. It is also possible that multiple instances of the same data record are contained in a data bag or that a first number of instances of a particular data record is part of a first data bag 91 while a second number of instances of said data record is part of bag B2. A plurality of bagging techniques is known in the art and may result in different kinds of data bags. The disjoint data sets 102-120 are distributed and stored in respective data slices DSL1-DSL10 in order to allow parallel processing of the data sub-sets by the processing units CPU1-CPU10 assigned to the respective data slices. In addition to the data records of the sub-sets, assignment information, e.g. in the form of assignment tables AXT1.1-AXT1.7, AXT2.5-AXT2.10 is distributed and stored to the respective data slices. The assignment AXT1.1, for example, assigns all data records contained in sub-set 102 to the root node $NO_{T1}$ of tree T1. AXT1.2 assigns all data records contained in sub-set 104 to the root node $NO_{T1}$ of tree T1. AXT2.8 assigns all data records contained in sub-set 116 to the root node $NO_{T2}$ of tree T2 and so forth. When the trees are grown iteratively, said assignments are updated as to assign the data records to the newly generated child nodes of the former current nodes. If a data slice comprises data records assigned to multiple data bags B1, B2, and thus to multiple trees T1, T2 to be grown, as is the case for data slices DSL5-DSL7, multiple assignment tables AXT1.5-AXT1.7 and AXT2.5-AXT2.7 may be distributed and stored in the respective data slice. It is also possible that multiple instances of the same data record are assigned to the same data bag and corresponding root node. In this case, the assignment tables may comprise a weight for said data record in respect to said data bag/tree, whereby the weight is indicative of the number of instances of said data record in said data bag. Once the data records have been distributed as indicated in FIG. 2, the parallel tree growing may be executed as depicted in greater detail in FIGS. 3 and 5.

FIG. 3 depicts a computer system 300 comprising a plurality of processing units CPU_C, CPU1-CPU10, a database management system 310 and a main memory 306. A module 308 of the DBMS 310 is operable to coordinate the parallel growing of the trees T1-T3 by the processing units CPU1-CPU10 which selectively process the data sub-sets contained in their dedicated data slices DSL1-DSL10. The module 310 may use one or more further CPUs depicted as CPU_C which are not dedicated to a particular data slice. Rather, CPU_C may be used for centrally managing the tree growing, e.g. by merging intermediate results IRs generated from the different data sub-sets 102-120 for all current nodes of a current forest level. The trees T1-T3 which are grown and the intermediate results calculated for the one or more current nodes of each of the trees are stored and centrally managed by module 308 in the main memory 306. For example, the trees and the intermediate results calculated for the current node level spanning all the processed trees T1, T2 and T3 (not shown) may be stored in temporary tables 302, 304 and may finally be stored to a non-volatile storage medium individually or in the form of a combined ensemble tree model 100. The trees, in particular the current nodes of said trees, and the intermediate results calculated for said nodes may be stored centrally. The trees and tree nodes may be updated by the DBMS module 308 using processing unit CPU_C continuously during the parallel tree growing process. The updating process is indicated in FIG. 3 by the read/update arrows. The assignment tables AXT1.1, . . . , AXT2.10 comprising information to which current node of which tree the data records of a particular data slice are assigned are stored in the individual data slices and are continuously updated by the dedicated processing unit CPU1-CUP10 of said data slice.

For clarity reasons, FIGS. 2 and 3 depict the sub-sets and temporary data structures for data bags B1 and B2/trees T1 and T2. However, data bag B3/tree T3 or any further data bag $B_n$/tree $t_n$ is processed analogously. Typically, the number of data bags is large in comparison to the number of CPUs and each data slice will contain instances from all or most of the data bags. Upon each single pass of the data records contained in a particular data slice, e.g. DSL 5, all current nodes assigned to any one of said data records are identified. For example, CPUS processing data sub-set 110 in DSL5 will identify at least one current node belonging to tree T1 and at least one current node belonging to tree T2. CPU2 operating on DSL3 would identify at least a current node of tree T1, but not of tree T2. Thus, in the case of data slices DSL5-DSL7, the intermediate results of at least two different trees, T1 and T2, can be calculated in a single pass through the data records in DSL5-DSL7.

Figure 5A:
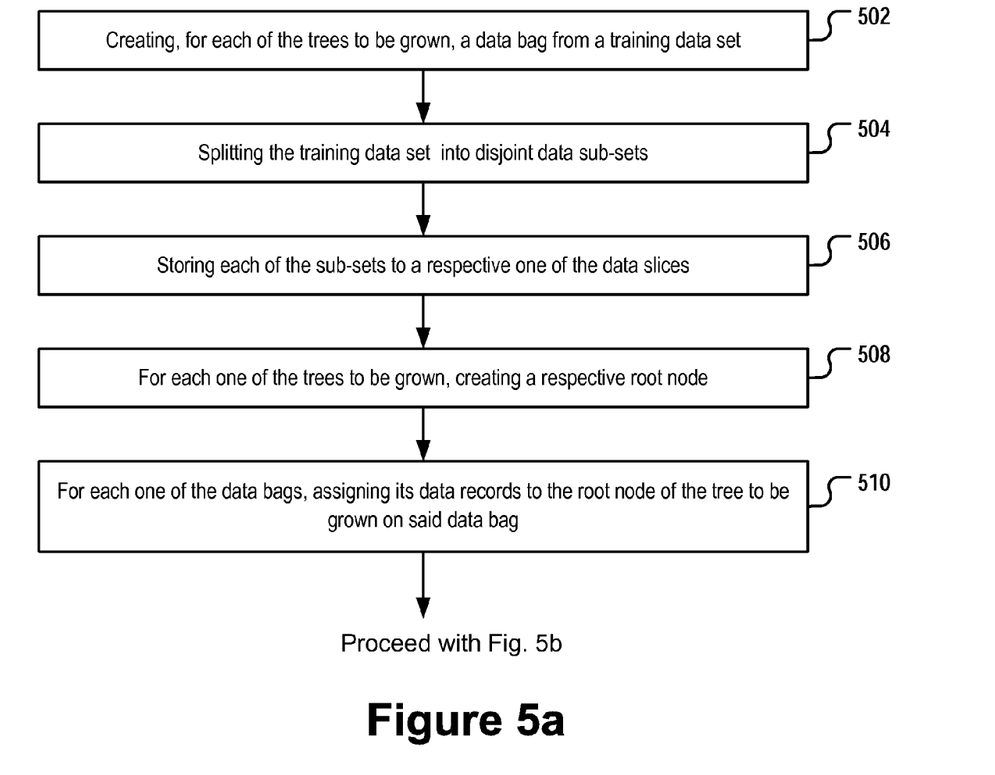
FIGS. 5a-b depict an embodiment of method of growing multiple trees.
Figure 5B:
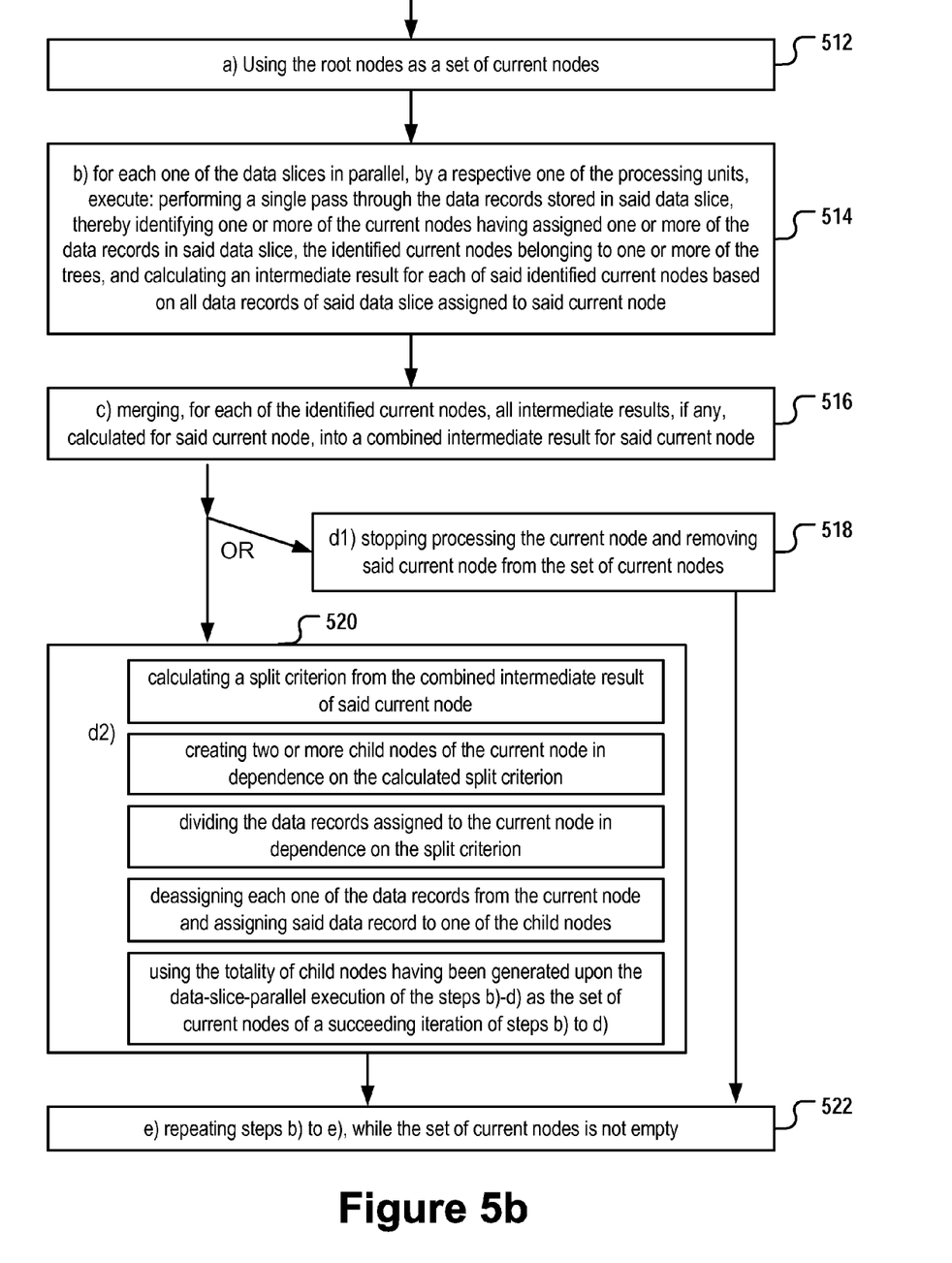

A parallel passing of the data records in all data slices is in fact a single pass through all the data records of the total training data set. Said parallel passing is considered as a single iteration of the tree growing algorithm as depicted in FIG. 5 in blocks 514-522. Thereby, the set of current nodes in the first iteration consists of the root nodes of all trees to be grown (FIG. 1: $NO_{T1}$, $NO_{T2}$, $NO_{T3}$). In the second iteration, the set of current nodes consists of the direct child nodes generated for the root nodes of all the trees (FIG. 1: $N1_{T1}$, $N2_{T1}$, $N1_{T2}$, $N2_{T2}$, $N1_{T3}$, $N2_{T3}$, $N3_{T3}$). In the third iteration, the set of current nodes consists of the child nodes generated in the second iteration (FIG. 1: $N3_{T1}$, $N3_{T2}$, $N4_{T2}$, $N4_{T3}$, $N5_{T3}$, $N6_{T3}$, $N7_{T3}$) and so forth. Thus, the parallel multi-tree growing algorithm, upon each iteration, adds child nodes of a further hierarchical level to each of the trees to be grown, whereby said adding is executed in parallel. Thus, a single pass through the data is enough for calculating the child nodes of the current tree level for all trees to be grown in parallel. This is because the data sub-set are disjoint, so each single data record is contained in only one of the data slices and is only processed once per iteration.

A pseudocode of one example implementation variant as shown below in Table 1 illustrates the parallel, tree-level-wise growing of multiple trees. As the multiple trees represent a forest, said tree growing approach can also be considered as parallel, forest-level-wise growing of the trees. Each iteration corresponds to the processing of a current forest level for creating a new set of current nodes constituting a new forest level to be used as current forest level/set of current nodes in the next iteration until the algorithm terminates.

TABLE 1

Definitions:

x: a data record
Q: the set of (unprocessed) current nodes of the current iteration of tree growing (or 'forest growing')
Q': the set of (unprocessed) current nodes for the next iteration of tree growing (or 'forest growing')
$c_{n,t,r}$: a child node of node n in tree t corresponding to outcome r of n's split criterion
$c_{n,t,r,sc(x)}$: a child node of node n in tree t corresponding to outcome r of n's split criterion sc obtained for data record x
MNC[x; t; n]: the assignment of data record x (and its copies) to node n of tree t
BA[x; t] : the assignment of data record x (and its copies) to data bag used to grow tree t Pseudocode:

1: partition the training set TTDR into disjoint data slices DSL1-DSL10 and distribute them to respective processing units CPU1-CPU10;
   //create root nodes for the trees
2:   for all trees t = T1; T2; : : : ;Tm do
3:     create the root node $NO_{Tt}$ and add tree-node pair <t; $n_{t,0}$> to Q;
4:   end for
   //assign data records to the root nodes
5:   for all data slices DSLd; d = 1; 2; : : : ; p in parallel do
6:     for all data records x ∈ DSLd do
7:       for all trees t = 1; 2; : : : ;m do
8:         MNC[x; t; $n_{t,0}$] := BA[x; t];
9:       end for
10:    end for
11: end for
12: while Q is not empty do:
   //calculate data-slice specific intermediate results for all nodes in Q
13:    for all data slices DSLd; d = 1; 2; : : : ; p in parallel do
14:      for all data records x ∈ DSLd do
15:        for all tree-node pairs <t; n> in Q do
16:          use x with weight MNC[x; t; n] to calculate an intermediate result
for node n of tree t (the intermediate result may comprise weighted attribute value statistics over the attribute value of a set of attributes of all data records assigned to current node n);
17:        end for
18:      end for
19:    end for
   //calculate combined intermediate results for each one of the nodes in Q
20:    merge intermediate results for node n calculated for all data slices
DS1;DS2; : : : ;DSp for generating a combined intermediate result and the candidate splits for said node n;
   //evaluate stop conditions
21:    for all tree-node pairs <t; n> in Q do
22:      if stop criteria of node n of tree t are satisfied then
23:        remove tree-node pair <t; n>from Q;
24:      end if
25:    end for
   //calculate splits, create child nodes, reassign data records to child nodes
26:    for all tree-node node pairs <t; n> in Q do
27:      calculate all candidate splits and select a split criterion $s_{t,n}$ for node n of tree t;
28:      for all possible outcomes r of the selected split criterion $s_{t,n}$ on the combined intermediate result of n do
29:        create a child node $c_{n,t,r}$ and add tree-node pair <t; $c_{n,t,r}$> to Q';
30:      end for
31:    end for
32: for all data slices DSLd; d = 1; 2; : : : ; p in parallel do
33:    for all data records x ∈ DSLd do
34:      for all tree-node pairs <t; n> in Q such that MNC[x; t; n] > 0 do
35:        MNC[x; t; $c_{n,t,r,sc(x)}$] := MNC[x; t; n];
   //reassign records to child nodes
36:      end for
37:    end for
38: end for TABLE 1-continued

```
39:     Q := Q';
40:     end while
```

Figure 4:
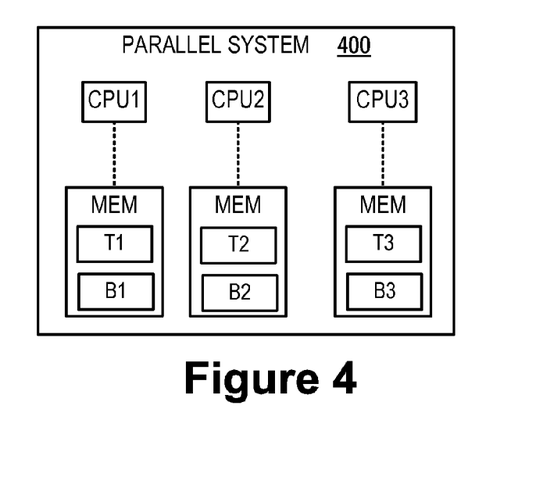
FIG. 4 depicts an embodiment of a computer system used for a state of the art ensemble model calculation approach.

FIG. 4 depicts a parallel system 400, e.g. a grid system, used for parallel tree growing. In said system, different trees T1-T3 are grown in parallel by distributing different data bags to different processing units respectively having a main memory and tree growing program logic; however, the data bags may comprise large overlaps. The data records of the distributed bags are therefore redundantly copied to multiple processing nodes and are transferred and processed multiple times in parallel. This increases network traffic and CPU consumption. In addition, the handling costs for creating and continuously updating the trees is larger for the system of FIG. 4 than for the system of FIG. 3. In FIG. 4 the trees are updated and maintained by each of the processing nodes of the grid while in FIG. 3 all trees are maintained and updated centrally (and thus only once).

FIGS. 5a-b depict a computer implemented method for growing multiple trees in a parallel database management system environment as depicted, for example, in FIG. 3. The method comprises several blocks 502-510 for generating and distributing multiple data bags, data sub-sets and assignments between data records of the sub-sets to the multiple trees to be grown as depicted in FIGS. 1 and 2.

In block 502, for each of the trees T1-T3 to be grown, a data bag B1-B3 is created as a derivative of the training data set TTDR. In block 504, the training data set is split into disjoint data sub-sets 102-120. In block 506, the sub-sets are stored to respective data slices DSL1-DSL10. In block 508, for each of the trees to be grown, a respective root node is created. The root nodes may be stored in the main memory 306. In block 510, for each of the data bags, the data records contained therein are assigned to the root node of the tree to be grown. Said assignment may be split into different sub-sets 102-120 and the resulting fragments AXT1.1-AXT2.10 of the assignment, e.g. parts of an assignment table, may be distributed to the respective data slices as depicted in FIG. 2.

In block 512, the totality of the root nodes is used as a set of current nodes (corresponding to the symbol 'Q' of the pseudocode), whereby the set of current nodes constitutes a current hierarchical level of all the trees which is to be processed in the current iteration. A single iteration corresponding to a single pass through the whole training set TTDR corresponds to blocks 514-520 of FIG. 5. In block 514, intermediate results are calculated for all current nodes in parallel by the multiple processing units CPU1-CPU10 whose corresponding data slice has received one of the data sub-sets 102-120. In block 516, for each of the current nodes in the current node set, all intermediate results calculated for said current node are merged, e.g. by a module of the DBMS, for calculating a combined, current node specific intermediate result. In block 518, each of the current nodes is evaluated to determine if the data records currently assigned to said current node should further be split and assigned to child nodes which could potentially be created for said current node or if said current node should be considered as a leaf node. In the former case, block 520 comprising a plurality of sub-blocks is executed. In case of the latter, block 518 is executed for the current node and another current node of the set of current nodes is selected. As indicated by block 522, blocks 514-520 are iterated until all trees have finished growing, i.e., until all current nodes of all trees are determined to be leaf nodes.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention. Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be clear to one skilled in the art that many improvements and modifications can be made to the foregoing exemplary embodiment without departing from the scope of the present invention.

What is claimed is:

1. A computer implemented method for growing a plurality of decision or regression trees in parallel, the method comprising:
    creating, for each of a plurality of trees to be grown, a data bag, each data bag being a derivative of a training data set, the training data set comprising a plurality of data records, the data bags acting as data basis for a respective one of the trees to be grown in a database management system that is in control of a plurality of processing units and of a plurality of data slices, the database management system being operable to process data stored in any one of the data slices by a respective one of the processing units;
    splitting the training data set into disjoint data sub-sets, each sub-set comprising zero, one or more of the data records of each of the data bags;
    storing each of the sub-sets in a respective one of the data slices;
    for each one of the plurality of trees to be grown, creating a respective root node;
    for each one of the data bags, assigning its data records to the root node of the tree to be grown on said data bag; and
    growing each of the plurality of trees by:
        designating the root node as a set of current nodes;
        for each one of the data slices in parallel, by a respective one of the processing units, performing a single pass through the data records stored in said data slice, thereby identifying one or more of the current nodes having assigned one or more of the data records in said data slice, the identified current nodes belonging to one or more of the trees, and calculating an intermediate result for each of said identified current nodes based on all data records of said data slice assigned to said current node;
        merging, for each of the identified current nodes, any intermediate results that were calculated for said current node, into a combined intermediate result for said current node; and
    for each one of the current nodes:
        calculating a split criterion from the combined intermediate result of said current node;
        creating two or more child nodes of the current node based on the calculated split criterion;
        dividing the data records assigned to the current node in dependence on the split criterion;
        de-assigning each one of the data records from the current node and assigning said data record to one of the child nodes according to said division; and
        designating the child nodes that were generated by the data-slice-parallel execution as the set of current nodes.

2. The computer-implemented method of claim 1, wherein the assigning of the data records to the root nodes comprises:
    for each of the sub-sets and for each of the trees to be grown, storing an assignment of the data records of said sub-set to the root node of said tree in the data slice comprising said sub-set, whereby said assignments are updated upon each de-assigning of the data records from one of the current nodes and upon each assigning of the data records to one of the child nodes of said current node.

3. The computer-implemented method of claim 2, wherein the identifying of the one or more of the current nodes having assigned one or more of the data records in the data slices is implemented by evaluating in parallel, by the processing units of the respective data slices, the assignments stored in said data slices.

4. The computer-implemented method claim 1, further comprising:
   evaluating, for each of the current nodes, one or more stop criteria, thereby taking the combined intermediate result of said current node as input;
   based on one of the stop criteria being met, stopping processing the current node and removing said current node from the set of current nodes.

5. The computer implemented method claim 1, further comprising:
   creating a first table, the first table being centrally managed by the database management system;
   while growing the plurality of trees in parallel, continuously storing and updating the created root nodes and child nodes in the first table, wherein each root node and child node comprises an identifier of its respective tree;
   after having finished the growing of the plurality of trees, storing the plurality of trees and a model having been derived from a combination of said trees to a non-transitory storage medium; and
   deleting the first table.

6. The computer implemented method of claim 1, the method further comprising:
   while growing the plurality of trees in parallel, continuously storing the intermediate results for each of the current nodes in the first table or in a second table in association with the respective current node; and
   upon having passed all data records in all the data slices in parallel, calculating the combined intermediate results for all the current nodes, storing the combined intermediate results in the first or second table.

7. The computer implemented method of claim 1, further comprising automatically creating each of the data bags by at least one of:
   splitting the training data sets into disjoint sub-sets;
   bootstrapping;
   jackknifing; and
   using copies of the original training data set as data bags.

8. The computer implemented method of claim 1, wherein assignment of any one of the data records to a current node of any one of the plurality of trees comprises weights, wherein each weight positively correlates with the number of copies of said data record being contained in the data bag acting as the data basis for growing said tree and wherein each weight was randomly assigned to said data record upon creation of the data bags.

9. A computer program product for growing a plurality of decision or regression trees, the computer program product comprising a computer readable storage medium having program instructions embodied therewith, the program instructions executable by a processing circuit to cause the processing circuit to:
   create, for each of a plurality of trees to be grown, a data bag, each data bag being a derivative of a training data set, the training data set comprising a plurality of data records, the data bags acting as data basis for a respective one of the trees to be grown in a database management system that is in control of a plurality of processing units and of a plurality of data slices, the database management system being operable to process data stored in any one of the data slices by a respective one of the processing units;
   split the training data set into disjoint data sub-sets, each sub-set comprising zero, one or more of the data records of each of the data bags;
   store each of the sub-sets in a respective one of the data slices;
   for each one of the plurality of trees to be grown, create a respective root node;
   for each one of the data bags, assign its data records to the root node of the tree to be grown on said data bag; and
   grow each of the plurality of trees by:
      designating the root node as a set of current nodes;
      for each one of the data slices in parallel, by a respective one of the processing units, performing a single pass through the data records stored in said data slice, thereby identifying one or more of the current nodes having assigned one or more of the data records in said data slice, the identified current nodes belonging to one or more of the trees, and calculating an intermediate result for each of said identified current nodes based on all data records of said data slice assigned to said current node;
      merging, for each of the identified current nodes, any intermediate results that were calculated for said current node, into a combined intermediate result for said current node; and
      for each one of the current nodes:
         calculating a split criterion from the combined intermediate result of said current node;
         creating two or more child nodes of the current node based on the calculated split criterion;
         dividing the data records assigned to the current node in dependence on the split criterion;
         de-assigning each one of the data records from the current node and assigning said data record to one of the child nodes according to said division; and
         designating the child nodes that were generated by the data-slice-parallel execution as the set of current nodes.

10. The computer program product of claim 9, wherein the assigning of the data records to the root nodes comprises:
   for each of the sub-sets and for each of the trees to be grown, storing an assignment of the data records of said sub-set to the root node of said tree in the data slice comprising said sub-set, whereby said assignments are updated upon each de-assigning of the data records from one of the current nodes and upon each assigning of the data records to one of the child nodes of said current node.

11. The computer program product of claim 10, wherein the identifying of the one or more of the current nodes having assigned one or more of the data records in the data slices is implemented by evaluating in parallel, by the processing units of the respective data slices, the assignments stored in said data slices.

12. The computer program product of claim 9, further comprising:
   evaluating, for each of the current nodes, one or more stop criteria, thereby taking the combined intermediate result of said current node as input;
   based on one of the stop criteria being met, stopping processing the current node and removing said current node from the set of current nodes.

13. The computer program product of claim 9, further comprising:
   creating a first table, the first table being centrally managed by the database management system;

while growing the plurality of trees in parallel, continuously storing and updating the created root nodes and child nodes in the first table, wherein each root node and child node comprises an identifier of its respective tree;

after having finished the growing of the plurality of trees, storing the plurality of trees and a model having been derived from a combination of said trees to a non-transitory storage medium; and deleting the first table.

14. The computer program product of claim 9, further comprising:

while growing the plurality of trees in parallel, continuously storing the intermediate results for each of the current nodes in the first table or in a second table in association with the respective current node; and upon having passed all data records in all the data slices in parallel, calculating the combined intermediate results for all the current nodes, storing the combined intermediate results in the first or second table.

15. A computer system for growing a plurality of decision or regression trees in parallel, the system comprising:

a memory; and a processor, communicatively coupled to said memory, the computer system configured to perform a method comprising:

creating, for each of a plurality of trees to be grown, a data bag, each data bag being a derivative of a training data set, the training data set comprising a plurality of data records, the data bags acting as data basis for a respective one of the trees to be grown in a database management system that is in control of a plurality of processing units and of a plurality of data slices, the database management system being operable to process data stored in any one of the data slices by a respective one of the processing units;

splitting the training data set into disjoint data sub-sets, each sub-set comprising zero, one or more of the data records of each of the data bags;

storing each of the sub-sets in a respective one of the data slices;

for each one of the plurality of trees to be grown, creating a respective root node;

for each one of the data bags, assigning its data records to the root node of the tree to be grown on said data bag; and growing each of the plurality of trees by:

designating the root node as a set of current nodes;

for each one of the data slices in parallel, by a respective one of the processing units, performing a single pass through the data records stored in said data slice, thereby identifying one or more of the current nodes having assigned one or more of the data records in said data slice, the identified current nodes belonging to one or more of the trees, and calculating an intermediate result for each of said identified current nodes based on all data records of said data slice assigned to said current node;

merging, for each of the identified current nodes, any intermediate results that were calculated for said current node, into a combined intermediate result for said current node; and for each one of the current nodes:

calculating a split criterion from the combined intermediate result of said current node;

creating two or more child nodes of the current node based on the calculated split criterion;

dividing the data records assigned to the current node in dependence on the split criterion;

de-assigning each one of the data records from the current node and assigning said data record to one of the child nodes according to said division; and designating the child nodes that were generated by the data-slice-parallel execution as the set of current nodes.

16. The system of claim 15, wherein the assigning of the data records to the root nodes comprises:

for each of the sub-sets and for each of the trees to be grown, storing an assignment of the data records of said sub-set to the root node of said tree in the data slice comprising said sub-set, whereby said assignments are updated upon each de-assigning of the data records from one of the current nodes and upon each assigning of the data records to one of the child nodes of said current node.

17. The system of claim 16, wherein the identifying of the one or more of the current nodes having assigned one or more of the data records in the data slices is implemented by evaluating in parallel, by the processing units of the respective data slices, the assignments stored in said data slices.

18. The system of claim 15, further comprising:

evaluating, for each of the current nodes, one or more stop criteria, thereby taking the combined intermediate result of said current node as input;

based on one of the stop criteria being met, stopping processing the current node and removing said current node from the set of current nodes.

19. The system of claim 15, further comprising:

creating a first table, the first table being centrally managed by the database management system;

while growing the plurality of trees in parallel, continuously storing and updating the created root nodes and child nodes in the first table, wherein each root node and child node comprises an identifier of its respective tree;

after having finished the growing of the plurality of trees, storing the plurality of trees and a model having been derived from a combination of said trees to a non-transitory storage medium; and deleting the first table.

20. The system of claim 15, further comprising:

while growing the plurality of trees in parallel, continuously storing the intermediate results for each of the current nodes in the first table or in a second table in association with the respective current node; and upon having passed all data records in all the data slices in parallel, calculating the combined intermediate results for all the current nodes, storing the combined intermediate results in the first or second table.

* * * * *